(12) United States Patent
Ishtiaq et al.

(10) Patent No.: US 8,763,042 B2
(45) Date of Patent: Jun. 24, 2014

(54) INFORMATION PROVISION

(71) Applicant: General Instrument Corporation, Horsham, PA (US)

(72) Inventors: Faisal Ishtiaq, Chicago, IL (US); Bhavan Gandhi, Vernon Hills, IL (US); Crysta J. Metcalf, Cary, IL (US)

(73) Assignee: Motorola Mobility LLC, Chicago, IL (US)

( * ) Notice: Subject to any disclaimer, the term of this patent is extended or adjusted under 35 U.S.C. 154(b) by 124 days.

(21) Appl. No.: 13/645,664

(22) Filed: Oct. 5, 2012

(65) Prior Publication Data

US 2014/0098293 A1    Apr. 10, 2014

(51) Int. Cl.
G06F 13/00 (2006.01)
G06F 3/00 (2006.01)
H04N 5/445 (2011.01)

(52) U.S. Cl.
USPC ............ 725/40; 725/41; 725/42; 725/43; 725/131; 725/133; 725/139; 725/141; 725/151; 725/153

(58) Field of Classification Search
USPC ............ 725/40–43, 131, 133, 139, 141, 151, 725/153
See application file for complete search history.

(56) References Cited

U.S. PATENT DOCUMENTS

| | | | |
|---|---|---|---|
| 6,282,713 B1 | 8/2001 | Kitsukawa et al. | |
| 6,889,382 B1 | 5/2005 | Anderson | |
| 7,022,075 B2 | 4/2006 | Grunwald et al. | |
| 7,194,754 B2 | 3/2007 | Tomsen et al. | |
| 7,284,201 B2 | 10/2007 | Cohen-Solal | |
| 7,289,606 B2 | 10/2007 | Sibal et al. | |
| 7,360,232 B2 * | 4/2008 | Mitchell | 725/112 |
| 7,365,651 B2 | 4/2008 | Massey et al. | |
| 7,460,940 B2 | 12/2008 | Larsson et al. | |
| 7,822,783 B2 | 10/2010 | Carrabis | |
| 7,861,260 B2 | 12/2010 | Shkedi | |
| 7,882,145 B2 | 2/2011 | Shenfield | |

(Continued)

FOREIGN PATENT DOCUMENTS

| | | |
|---|---|---|
| EP | 2282543 A2 | 2/2011 |
| GB | 2361128 A | 10/2001 |

(Continued)

OTHER PUBLICATIONS

Kavaldjian, S.; Falb, J.; Kaindl, H., "Generating content presentation according to purpose", Systems, Man and Cybernetics, 2009. SMC 2009. IEEE International Conference on Digital Object Identifier: 10.1109/ICSMC.2009.5346348 Publication Year: 2009 , pp. 2046-2051, IEEE Conference Publications, Abstract Only.

(Continued)

*Primary Examiner* — Mulugeta Mengesha

(57) ABSTRACT

Disclosed are methods and apparatus for providing information to a first client device (e.g., a tablet computer) for presentation on that device. The information may be related to multimedia content (e.g., a television program) that may be presented using a second client device (e.g., a television). Firstly, an activity level for a portion of the multimedia content is determined. Using the activity level, an amount of the information is assigned to that portion of the multimedia content. The amount of the information assigned is dependent on that determined activity level. The assigned information is then provided for use by (e.g., for display on) the first client device.

1 Claim, 3 Drawing Sheets

(56) References Cited

U.S. PATENT DOCUMENTS

| | | | |
|---|---|---|---|
| 7,890,849 | B2 | 2/2011 | Moraveji et al. |
| 7,908,172 | B2 | 3/2011 | Corts et al. |
| 8,060,904 | B1 | 11/2011 | Evans et al. |
| 8,079,054 | B1* | 12/2011 | Dhawan et al. ............... 725/105 |
| 8,392,238 | B2 | 3/2013 | Amento et al. |
| 2001/0013125 | A1 | 8/2001 | Kitsukawa et al. |
| 2002/0026359 | A1 | 2/2002 | Long et al. |
| 2002/0059590 | A1 | 5/2002 | Kitsukawa et al. |
| 2002/0104086 | A1 | 8/2002 | Tomsen et al. |
| 2002/0144259 | A1 | 10/2002 | Gutta et al. |
| 2002/0162121 | A1 | 10/2002 | Mitchell |
| 2003/0014491 | A1 | 1/2003 | Horvitz et al. |
| 2003/0018969 | A1 | 1/2003 | Humpleman et al. |
| 2003/0097659 | A1 | 5/2003 | Goldman |
| 2003/0135539 | A1 | 7/2003 | Kondo et al. |
| 2003/0182620 | A1 | 9/2003 | Errico et al. |
| 2004/0158859 | A1 | 8/2004 | Aoyama et al. |
| 2004/0226034 | A1 | 11/2004 | Kaczowka et al. |
| 2005/0060745 | A1 | 3/2005 | Riedl et al. |
| 2006/0265651 | A1 | 11/2006 | Buck |
| 2006/0271995 | A1 | 11/2006 | Hagawa et al. |
| 2007/0021065 | A1 | 1/2007 | Sengupta et al. |
| 2007/0094083 | A1 | 4/2007 | Yruski et al. |
| 2007/0260521 | A1 | 11/2007 | Van Der Riet |
| 2008/0127246 | A1 | 5/2008 | Sylvain |
| 2008/0243610 | A1 | 10/2008 | Ragno et al. |
| 2008/0276270 | A1 | 11/2008 | Kotaru et al. |
| 2008/0307351 | A1 | 12/2008 | Louch et al. |
| 2009/0055383 | A1 | 2/2009 | Zalewski |
| 2009/0132276 | A1 | 5/2009 | Petera |
| 2009/0132339 | A1 | 5/2009 | Sloo et al. |
| 2009/0320073 | A1 | 12/2009 | Reisman |
| 2010/0013997 | A1 | 1/2010 | Hwang |
| 2010/0046606 | A1 | 2/2010 | Celik et al. |
| 2010/0095317 | A1 | 4/2010 | Toebes et al. |
| 2010/0211439 | A1 | 8/2010 | Marci et al. |
| 2010/0299187 | A1 | 11/2010 | Duggal |
| 2011/0016498 | A1 | 1/2011 | Tsuria et al. |
| 2011/0072370 | A1 | 3/2011 | Mitchell et al. |
| 2011/0106744 | A1 | 5/2011 | Becker et al. |
| 2011/0154499 | A1 | 6/2011 | Rohan et al. |
| 2011/0161998 | A1 | 6/2011 | Alberth et al. |
| 2011/0270653 | A1 | 11/2011 | Gupta et al. |
| 2012/0011550 | A1 | 1/2012 | Holland |
| 2012/0096486 | A1 | 4/2012 | Stallard et al. |
| 2012/0102233 | A1 | 4/2012 | Shah et al. |
| 2012/0210348 | A1* | 8/2012 | Verna et al. ............... 725/25 |
| 2012/0297406 | A1 | 11/2012 | Bartholomay et al. |
| 2012/0311640 | A1* | 12/2012 | Cahnbley et al. ............... 725/53 |
| 2013/0014136 | A1 | 1/2013 | Bhatia et al. |
| 2013/0014137 | A1 | 1/2013 | Bhatia et al. |
| 2013/0014138 | A1 | 1/2013 | Bhatia et al. |
| 2013/0014141 | A1 | 1/2013 | Bhatia et al. |
| 2013/0014143 | A1 | 1/2013 | Bhatia et al. |
| 2013/0014144 | A1 | 1/2013 | Bhatia et al. |
| 2013/0014145 | A1 | 1/2013 | Bhatia et al. |
| 2013/0014146 | A1 | 1/2013 | Bhatia et al. |
| 2013/0019258 | A1 | 1/2013 | Bhatia et al. |
| 2013/0024293 | A1* | 1/2013 | Tinsman et al. ........... 705/14.68 |
| 2013/0055300 | A1 | 2/2013 | Hanina |
| 2013/0159876 | A1 | 6/2013 | Narasimhan et al. |
| 2013/0160036 | A1 | 6/2013 | Narasimhan et al. |
| 2013/0170813 | A1* | 7/2013 | Woods et al. ................ 386/200 |

FOREIGN PATENT DOCUMENTS

| | | |
|---|---|---|
| JP | 2005013713 A | 1/2005 |
| WO | 2011032777 A1 | 3/2011 |
| WO | 2012174301 A1 | 12/2012 |

OTHER PUBLICATIONS

Chen, Qiming et al.: "Operational BI platform for video analytics", Proceeding MEDES '09 Proceedings of the International Conference on Management of Emergent Digital EcoSystems ACM New York, NY, USA 2009, Abstract Only.

James Taylor, "Bringing Analytics into Processes Using Business Rules", BPMInstitute.org, http://www.bpminstitute.org/resources/articles/bringing-analytics-processes-using-business-rules, Monday, Apr. 10, 2006.

A. Carr, "With AmEx Partnership, Foursquare May Prove Social Media's Real ROI", accessed at http://www.fastcompany.com/1762726/amex-partnership-foursquare-may-prove-social-medias-real-roi, accessed on May 2, 2013.

A. Klaassen "Podbridge Aims to put Fresh Ads in Time-shifted Content", Ad Age digital, Ad & Marketing News, published Aug. 1, 2006, accessed at http://adage.com/article/digital/podbridge-aims-put-fresh-ads-time-shifted-content/110835/ (3 pages).

A.Chianese, et al., "Scene Detection using Visual and Audio Attention", Ambi-sys '08, ACM (7 pages) (Feb. 2008).

B. Carter, "TiVo to Buy Company That Tracks Shopping of TV Viewers", accessed at http://www.nytimes.com/2012/07/17/business/media/tivo-to-buy-tra-which-tracks-buying-habits-of-tv-viewers.html, accessed on May 2, 2013.

B. Schauerte, et al., "Multimodal Saliency-based Attention for Object-based Scene Analysis", International Conference on Intelligent Robots and Systems (IROS),IEEE/RSJ, pp. 1173-1179 (Sep. 2011).

G. Evangelopoulos, et al., "Video Event Detection Andsummarization Using Audio, Visual and Text Saliency", IEEE International Conference on Acoustics, Speech and Signal Processing, pp. 3553-3556 (Apr. 2009).

M. Mancas, et al., "Human Attention Modelization and Data Reduction", Video Compression, eds. Dr. Amal Punchihewa, InTech, pp. 103-128 (Mar. 2012).

Mediamind "O2 Dual Screen Case Study for Million Pound Drop", accessed at http://www.mediamind.com/resource/o2-dual-screen-case-study-million-pound-drop, downloaded from Internet: Nov. 2012 (5 pages).

P. Baldi, et., "Of bits and wows: A Bayesian theory of surprise with applications to attention", Neural Networks, vol. 23, No. 5, pp. 649-666,(2010).

Secondscreen Networks, "The Ad Platform for the Second Screen", accessed at http://www.secondscreen.com/how-it-works, downloaded from internet: Nov. 15, 2012 (3 pages).

Yahoo! Finance, "DG Announces Pioneering Dual-Screen Video Ad Platform," press release: DG—Apr. 2012, accessed at http://finance.yahoo.com/news/dg-announces-pioneering-dual-screen-161500829.html (2 pages).

Y-F. Ma, et al., "A User Attention Model for Video Summarization", ACM Multimedia, (10 pages), Dec. 2002.

Patent Cooperation Treaty, International Search Report and Written Opinion of the International Searching Authority for International Application No. PCT/US2013/060806, Dec. 4, 2013, 15 pages.

United States Patent and Trademark Office, "Notice of Allowance and Fee(s) Due" for U.S. Appl. No. 13/682,946 dated May 14, 2013, 17 pages.

\* cited by examiner

INFORMATION PROVISION

TECHNICAL FIELD

The present disclosure is related to providing information to a client device for presentation on that client device.

BACKGROUND

Whilst consuming (or being presented with) primary multimedia content (e.g., multimedia presentations such as movies, TV programs, etc.), a consumer may also consume, search for (e.g., by browsing on the Internet), or access secondary multimedia content (e.g., using a client device different from the client device with which the consumer is consuming the primary multimedia content).

This secondary multimedia content may be related to the primary multimedia content. For example, this secondary multimedia content may, for example, include cast and crew information, episode and season information, or any other information related to the primary multimedia content.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
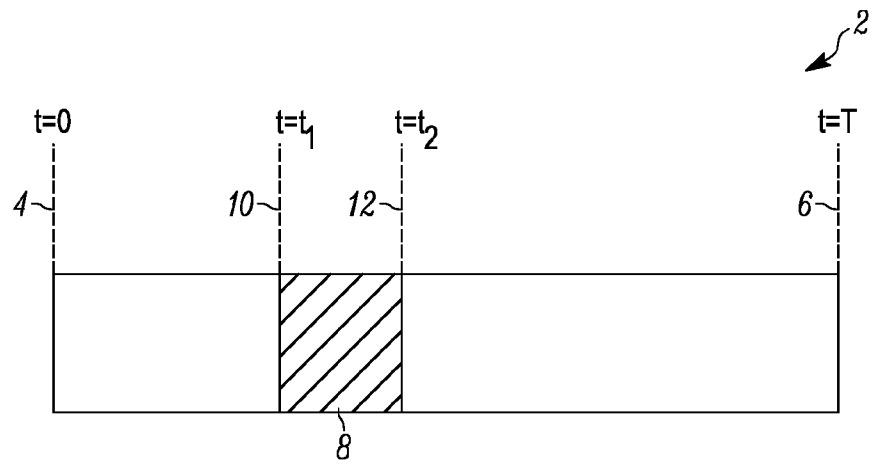
FIG. 1 is a schematic illustration (not to scale) showing a TV program.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present inventor has realized that secondary multimedia content may be presented to the consumer in such a way that the consumer is distracted from the primary multimedia content, e.g., during periods within the primary multimedia content in which key events occur or in which lots of "activity" (i.e., action) occurs.

Also, the present inventor has realized that secondary multimedia content may be presented to the consumer in such a way that lots of secondary multimedia content is presented to the consumer during periods within the primary multimedia content in which key events occur or in which lots of "activity" (i.e., action) occurs. In such cases the consumer's attention is most likely to be on the primary multimedia content, and the consumer is less likely to be exposed to the secondary multimedia content.

Embodiments of the present invention include methods and apparatus for providing information to a first client device (e.g., a tablet computer, a laptop computer, or a smartphone). The information may be for presentation (e.g., display) using the first client device (e.g., to a user of that device). The information may be related to multimedia content (e.g., a television program) that may be presented (e.g., simultaneously to the presentation of the information) using a second client device (e.g., a television). The multimedia content may, for example, be sent from a source to the second client device in any appropriate format, e.g., encoded as a transport stream. The methods may comprise determining an activity level for one or more different portions of the multimedia content. An activity level may indicate how much activity, action, etc., occurs within the portion of the multimedia content for which the activity level is determined. Using the activity level, an amount of the information may be assigned to the portion of the multimedia content for which the activity level was determined. The amount of the information assigned to the portion of the multimedia content may depend on its activity level. For example, if the activity level of the portion indicates that a relatively large amount of activity occurs in that portion, then a relatively small amount of the information may be assigned to that portion. Similarly, if the activity level of the portion indicates that a relatively small amount of activity occurs in that portion, then a relatively large amount of the information may be assigned to that portion. Thus, the information may be distributed across different portions of the multimedia content. The assigned information may then be bound, encoded, etc., into an "information stream." The information stream may be any appropriate type of data stream, e.g., a data stream that the first client device is able to process. The information stream may be the same stream as, or a stream different from, a stream in which the multimedia content may be provided to the second client device. This information stream may then be provided for use by the first client device (e.g., by sending the stream to the first client device).

Timing information (e.g., a timestamp, etc.) that indicates which portion of the multimedia content corresponds to assigned information may also be provided for use by the first client device. Thus, using the timing information, the first device may present the information assigned to the portion of the multimedia content at the same time that that portion of the multimedia content is presented by the second client device. In other words, the multimedia content and the information related to the multimedia content may be time synchronized. This may be such that, when the multimedia content is presented (i.e., played back) on the second client device, the information may also be presented on the first client device in such a way that, at a particular time, the information that is being displayed on the first client device corresponds to the portion of the multimedia content currently being displayed on the second client device.

Speed information that indicates how quickly the assigned information is to be presented by the first client device may be determined (e.g., by using the determined activity level for the portion of the multimedia content to which the assigned information is assigned). This speed information may be provided to the first client device. The first client device may present the assigned information at the speed indicated by the speed information.

One or more templates that indicate or include estimates of activity levels within different types or genres of multimedia content may be provided. A template may be selected from the plurality of templates and used during the assignment of information.

Apparatus for implementing any of the below described arrangements, and for performing any of the below described method steps, may be provided by configuring or adapting any suitable apparatus, for example one or more computers or other processing apparatus or processors, or by providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the figures, FIG. 1 is a schematic illustration (not to scale) showing a TV program 2. The TV program 2 is used herein to illustrate embodiments of a process of presenting (to a user) programmatic metadata (i.e., metadata, data, or multimedia content, etc., related to the TV program 2). This presentation process is described in more detail below with reference to FIG. 5. It will be appreciated that in other embodiments the presentation process may be implemented with a different type of multimedia content (e.g., a movie, an ebook, a radio broadcast, etc.) instead of or in addition to the TV program 2.

The terminology "multimedia content" is used herein to refer to data representing literary, lyrical, or viewable content, including television or videographic content such as recorded television data, DVD data, digital picture data, and the like.

Further information related to the multimedia content, for example, including cast and crew information, episode and season information, etc., may be provided (e.g., by a provider of the multimedia content) alongside the multimedia content. This further information is hereinafter referred to as "programmatic metadata." The programmatic metadata may be any appropriate supplementary information related to the primary multimedia content (i.e., to the TV program 2). For example, the supplementary information that is to be presented may comprise advertisements, games, recommendations for products, services or other multimedia, etc., related to the primary multimedia content (i.e., to the TV program 2).

There are several sources for programmatic metadata. These sources may provide programmatic metadata to any party, e.g., consumers, providers of entertainment services, etc. Example sources of programmatic metadata include commercial aggregators of appropriate information, sources that mine the appropriate information from, for example, web sites, etc.

The TV program 2 may be consumed by a consumer using any appropriate client device (e.g., a laptop computer, a tablet computer, a television). The TV program 2 runs from its start time 4 at time t=0 to its end time 6 at time t=T. In embodiments in which the media presentation is, e.g., an ebook, the media presentation may run from 'page 1' to 'page N' (where N is the number of pages in the ebook). Thus, as opposed to being time-based media, a media presentation may also be non-time-based. The media presentation may also comprise a multi-device presentation, i.e., a multimedia presentation to be shown on more than one device. For example, the media presentation may comprise a slide presentation to be shown by one device and a video presentation to be shown by another device.

The TV program 2 may be of any genre, for example, a history documentary, a news broadcast, an entertainment program, a sports program, etc. A format for the TV program 2 may follow a template format.

A scene in the TV program 2 (hereinafter referred to as the "scene" and shown in FIG. 1 as a shaded region of the TV program 2 and indicated by the reference numeral 8) has start and end demarcation points (indicated in FIG. 1 by the reference numerals 10 and 12 respectively). The start demarcation point 10 of the scene 8 occurs in the TV program 2 at time t=t1. The end demarcation point 12 of the scene 8 occurs in the TV program 2 at time t=t2. The start demarcation point 10 may be any time point in the TV program 2 between t=0 and t=T. The end demarcation point 12 may occur at any time point in the TV program that is equal to or later than the start demarcation point 10. The scene 8 of the TV program 2 may contain relatively fast-paced action, e.g., compared to other parts of the TV program 2 (e.g., the TV program 2 may be an athletics program and scene 8 may be an athletics event within that show, etc.). Alternatively, the scene 8 of the TV program 2 may contain relatively slow-paced action, e.g., compared to other parts of the TV program 2 (e.g., the TV program 2 may be an athletics program and scene 8 may comprise sports pundits or commentators commenting on a subject). The scene 8 of the TV program 2 may be more likely to hold a viewer's attention than other parts of the TV program 2 (e.g., the TV program 2 may be a soccer match and the scene 8 may comprise a penalty within that soccer match). Alternatively, the scene 8 of the TV program 2 may be less likely to hold a viewer's attention than other parts of the TV program 2 (e.g., the scene 8 may be a commercial break within the TV program 2).

Figure 2:
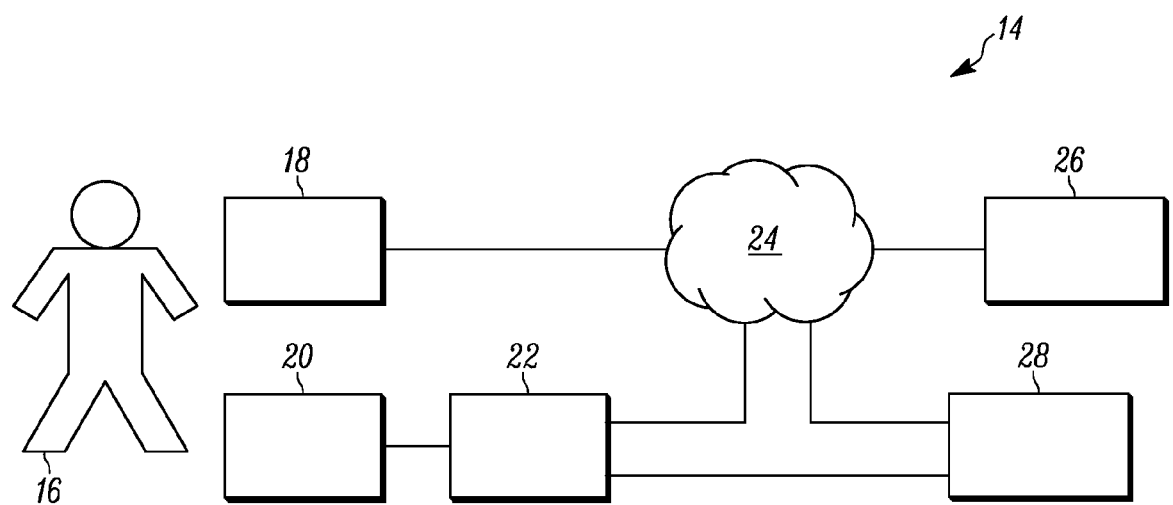
FIG. 2 is a schematic illustration (not to scale) of an example network.

FIG. 2 is a schematic illustration (not to scale) of an example network 14. The process of presenting programmatic metadata, as performed by the entities of the network 14, is described in more detail below with reference to FIG. 5.

The representative network 14 comprises a user 16, a tablet computer 18, a television 20, a set-top box 22, the Internet 24, a service provider 26, and a multimedia content provider 28. In other embodiments a different companion device may be used instead of or in addition to the tablet computer 18. Also, in other embodiments, one or more other devices may be used instead of or in addition to any of the devices in the example network 14. For example, in other embodiments the TV 20 may be replaced by a different type of device or computer. Also, in other embodiments, one or more devices from the network 14 may be omitted. For example, in other embodiments the set-top 22 may be omitted, e.g., by incorporating its functionality into the TV 20.

The user 16 is a user or operator of the tablet computer 18 and of the TV 20. For example, the user 16 may browse the Internet 24 using the tablet computer 18 and may watch the TV program 2 on the TV 20.

The tablet computer 18 is a conventional tablet computer. The tablet computer 18 is coupled to the service module 26 via the Internet 24 (e.g., via Wi-Fi Internet access). This coupling is such that information may be sent from the service module 26 to the tablet computer 18 and vice versa. For example, programmatic metadata relating to the TV program 2 may be sent from the service module 26 to the tablet computer 18 for display to the user 16, e.g., as described in more detail below with reference to FIG. 5. In other embodiments, a different type of device may replace the tablet computer 18, e.g., a different type of computer (e.g., a laptop computer or a "smartphone").

The TV 20 is a conventional television on which, in operation, media content (e.g., the TV program 2) received from the set-top box 22 is displayed to the user 16. The set-top box 22 may receive the media content (e.g., the TV program 2) from the content provider 28. The TV 20 may also be coupled to the service module 26 via the set-top box 22 and the Internet 24. This coupling is such that information may be sent from the TV 20 to the service module 26 and vice versa. Also, information may be sent from the set-top box 22 or content provider 28 to the service provider 26 and vice versa. For example, information relating to the TV program 2 being displayed to the user 16 on the TV 20 may be sent from the content provider 28 to the service module 26.

In other embodiments, a different type of device may replace any or all of the tablet computer 18, set-top box 22, and the TV 20. Such devices may include a desktop personal computer, a laptop computer, a tablet computer, a mobile station, an entertainment appliance, a set-top box communicatively coupled to a television, a wireless phone, a smartphone, a netbook, a game console, etc.

The service module 26 processes programmatic metadata relating to the TV program 2 prior to that programmatic metadata being provided for consumption by the user 16. The service module 26 is described in more detail below with reference to FIG. 3.

Figure 3:
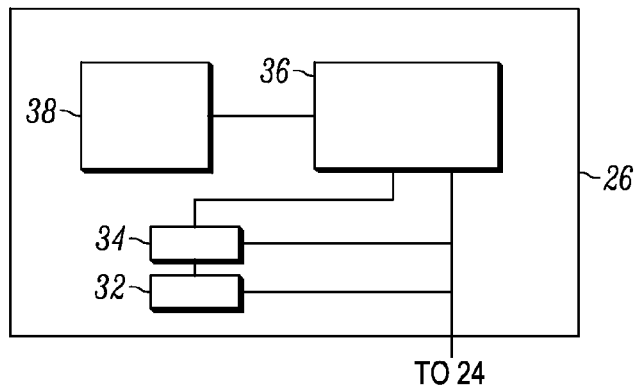
FIG. 3 is a schematic illustration (not to scale) of a service module.

FIG. 3 is a schematic illustration (not to scale) of the service module 26 in this embodiment.

The service module 26 comprises a metadata processor 32, an activity-detection module 34, a processor 36, and a data base 38.

The metadata processor 32 is coupled to the Internet 24. This coupling is such that information may be sent between the metadata processor 32 and other entities in the network 14 (e.g., the content provider 28) via the Internet 24. For example, the TV program 2 and programmatic metadata relating to the TV program 2 may be sent from the content provider 28 to the metadata processor 32, as described in more detail below with reference to FIG. 5.

The metadata processor 32 is configured to process the programmatic metadata relating to the TV program 2 received by the metadata processor 32 from the content provider 28. The metadata processor 32 may, for example, processes the programmatic metadata relating to the TV program 2 to determine a genre of the TV program 2. This processing is described in more detail below with reference to FIG. 5.

The metadata processor 32 is further coupled to the activity-detection module 34 and to the processor 36. This coupling is such that an output of the metadata processor 32 may be sent from the metadata processor 32 to each of the activity-detection module 34 and the processor 36.

The activity-detection module 34 is coupled to the Internet 24. This coupling is such that information may be sent between the activity-detection module 34 and other entities in the network 14 (e.g., the content provider 28) via the Internet 24. For example, the TV program 2 and programmatic metadata relating to the TV program 2 may be sent from the content provider 28 to the activity-detection module 34, as described in more detail below with reference to FIG. 5.

The activity-detection module 34 is configured to process the TV program 2 or the programmatic metadata relating to the TV program 2 received by the activity-detection module 34 from the content provider 28. This processing may comprise using an output (that corresponds to the same TV program 2) of the metadata processor 32. This processing by the activity-detection module 34 may be performed to detect, determine, or assess a level of activity within some or all of the TV program 2. For example, the processing by the activity-detection module 34 may be performed to detect, determine, or assess a level of activity within the scene 8. The terminology "level of activity" within a portion of the TV program 2 may be any appropriate parameter the value of which is indicative of an amount of activity or action within that portion of the TV program 2. For example, the level of activity within the scene 8 of the TV program 2 may be indicative of how many objects are moving in that scene 8 or how quickly those objects are moving (e.g., a scene that includes more and faster objects may have a relatively higher activity level than a scene that includes fewer and slower moving objects). Also for example, the level of activity within the scene 8 of the TV program 2 may be indicative of a level of noise within that scene 8 (e.g., a scene with a higher noise level may have a relatively higher activity level than a scene with a lower noise level). Any appropriate process or algorithm may be used by the activity-detection module 34 to determine an activity level. This processing by the activity-detection module 34 is described in more detail below with reference to FIG. 5.

The activity-detection module 34 is further coupled to the processor 36. This coupling is such that an output of the activity-detection module 34 may be sent from the activity-detection module 34 to the processor 36.

In other embodiments, the activity-detection module 34 may be at a location different from that described above. For example, in other embodiments the functionality provided by the activity-detection module 34 may be provided by the set-top box 22 or by a cable head-end.

The processor 36 is coupled to the Internet 24. This coupling is such that information may be sent among the processor 36 and other entities in the network 14 (e.g., the content provider 28 and the tablet computer 18) via the Internet 24. For example, the TV program 2 and the programmatic metadata relating to the TV program 2 may be sent from the content provider 28 to the activity-detection module 34, as described in more detail below with reference to FIG. 5. Also, programmatic metadata relating to the TV program 2 may be sent from the processor 36 to the tablet computer 18, as described in more detail below with reference to FIG. 5.

The processor 36 is further coupled to the database 38. This is such that information stored in the database 38 may be retrieved from the database 38 by the processor 36.

The processor 36 is configured to process the TV program 2 information and the programmatic metadata relating to the TV program 2 received by the activity-detection module 34 from the content provider 28. This processing may comprise using an output (that corresponds to the same TV program 2) of the activity-detection module 34. This processing may comprise using information stored in the database 38. This processing by the processor 36 is described in more detail below with reference to FIG. 5.

The processor 36 is described in more detail below with reference to FIG. 4.

The database 38 may store information that may be accessed by the processor 36 for use by the processor 36. The database may store a plurality of program templates. A program template for a particular genre of TV program (e.g., a program template for a sports program, or an entertainment program, or a news broadcast) may be a template that a TV program of that particular genre would most likely follow. For example, news broadcasts may follow a similar format, and a program template for a news broadcast may specify this format. The database may store program templates for a plurality of different TV program genres.

Figure 4:
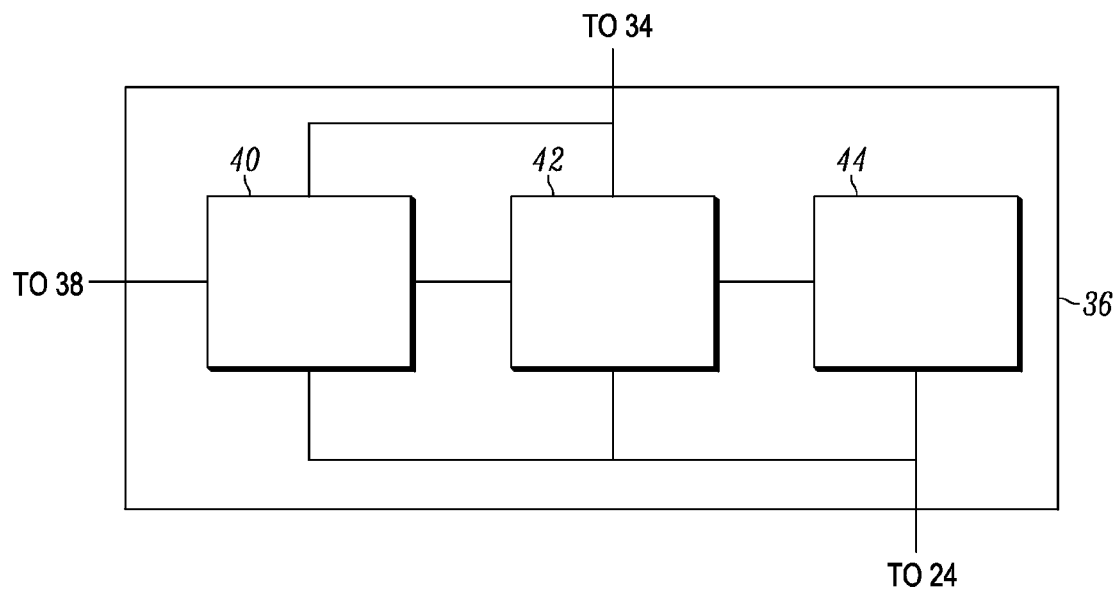
FIG. 4 is a schematic illustration (not to scale) of a processor.

FIG. 4 is a schematic illustration (not to scale) of the processor 36 in this embodiment.

The processor 36 comprises a template-selection module 40, a metadata-placement module 42, and a metadata binder 44.

The template-selection module 40 is coupled to the activity-detection module 34. This coupling may be such that the template-selection module 40 may receive an output of the activity-detection module 34.

The template-selection module 40 is further connected to the Internet 24. This coupling is such that information may be sent between the template-selection module 40 and other entities in the network 14 (e.g., the content provider 28) via the Internet 24. For example, information relating to the TV program 2 may be sent from the content provider 28 to the template-selection module 40, as described in more detail below with reference to FIG. 5.

The template-selection module 40 is further connected to the database 38. This coupling is such that information may be retrieved by the template-selection module 40. For example, as described in more detail below with reference to FIG. 5, the template-selection module 40 may perform a template-selection process (e.g., using information received by the template-selection module 40 from the activity-detection module 34 or from the content provider 28) to select one or more program templates stored in the database 38.

The template-selection module 40 is further coupled to the metadata-placement module 42 such that an output of the template-selection module 40 may be sent from the template-selection module 40 to the metadata-placement module 42.

The metadata-placement module 42 is coupled to the activity-detection module 34. This coupling may be such that the metadata-placement module 42 may receive an output of the activity-detection module 34.

The metadata-placement module 42 is further connected to the Internet 24. This coupling is such that information may be sent between the metadata-placement module 42 and other entities in the network 14 (e.g., the content provider 28) via the Internet 24. For example, information relating to the TV program 2 may be sent from the content provider 28 to the metadata-placement module 42, as described in more detail below with reference to FIG. 5.

The metadata-placement module 42 may be configured to process information received by it (i.e., the information relating to the TV program 2 that may be received, e.g., via the Internet 24, from the content provider 28, the output of the template-selection module 40, and the output of the activity-detection module 34). This processing is described in more detail below with reference to FIG. 5.

The metadata-placement module 42 is further coupled to the metadata binder 44 such that an output of the metadata-placement module 42 may be sent from the metadata-placement module 42 to the metadata binder 44.

The metadata binder 44 is connected to the Internet 24. This coupling is such that information may be sent between the metadata binder 44 and other entities in the network 14 (e.g., the content provider 28) via the Internet 24. For example, information relating to the TV program 2 may be sent from the content provider 28 to the metadata binder 44, as described in more detail below with reference to FIG. 5. Also for example, an output of the metadata binder 44 may be sent from the metadata binder 44, via the Internet 24, to the tablet computer 18 for consumption by the user 16.

The metadata binder 44 may be configured to process information received by it (i.e., the information relating to the TV program 2 that may be received, e.g., via the Internet 24, from the content provider 28, and the output of the metadata-placement module 42). This processing may comprise formatting the programmatic metadata so that they are in a format useable by the tablet computer 18. The processing performed by the metadata binder is described in more detail below with reference to FIG. 5.

Figure 5:
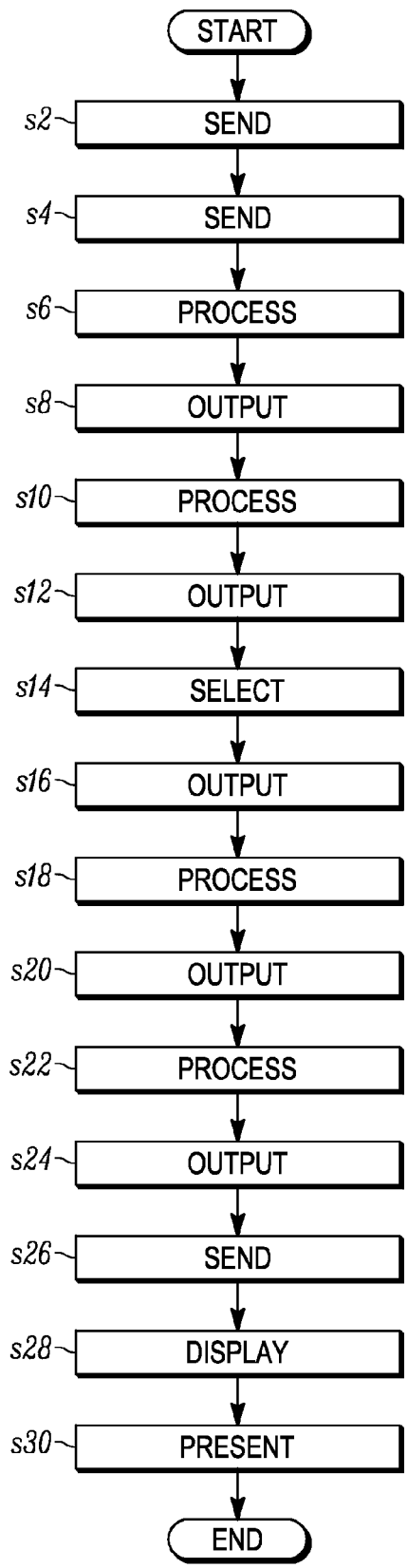
FIG. 5 is a process flowchart show certain steps of a process for presenting programmatic metadata related to the TV program.

FIG. 5 is a process flow chart show certain steps of a process for presenting programmatic metadata related to the TV program 2, as may be performed by the entities of the network 14.

At step s2, the content provider 28 provides the TV program 2 to the set-top box 22.

At step s4, the content provider 28 provides the TV program 2 and programmatic metadata relating to the TV program 2 to the service provider 26.

In other embodiments, the TV program 2 or the programmatic metadata relating to the TV program 2 may be provided to the service provider 26 by a different entity (i.e., other than the content provider 28). For example, in other embodiments, the service provider 26 may retrieve or be sent (e.g., via the Internet) programmatic metadata relating to the TV program 2 from a commercial aggregator of programmatic metadata that may be remote from the content provider 28. In other embodiments, the set-top box 22 may extract programmatic metadata relating to the TV program 2 from the information sent to it from the content provider 28 at step s2 and make that programmatic metadata relating to the TV program 2 available to the service provider 26.

At step s6, the metadata processor 32 (of the service provider 26) processes the programmatic metadata relating to the TV program 2 that are provided to the service provider 26 by the content provider 28. The metadata processor 32 may, for example, determine a genre of the TV program 2 using the programmatic metadata relating to the TV program 2. The metadata processor 32 may, for example, determine events that may occur, or identify events that do occur, in the TV program 2. The information determined by the metadata processor 32 may be any appropriate type of information that may be used by the activity-detection module 34 during the processing performed by the activity-detection module 34 at step s10 (described in more detail below). An example of a process that may be performed by the metadata processor 32 is receiving programmatic information relating to the TV program 2 (e.g., including the title of the TV program 2) and, using this information, searching (e.g., via the Internet 24) one or more databases (e.g., public databases or private databases) to find and retrieve additional information relating to the TV program 2 (such as the cast, release date, genre, and sub-genres). Another example process may include the metadata processor 32, using the received programmatic metadata, extracting, from an electronic program guide, additional information about the TV program 2. The information determined or acquired by the metadata processor 32 at step s6 may be data that are appropriate for use by (e.g., for guiding) the activity-detection module 34.

A process performed by the metadata processor 32 may be manual (e.g., performed by a human operator) or automatic.

At step s8, the information determined by the metadata processor 32 at step s6 (e.g., the genre of the TV program 2, etc.) is output by the metadata processor 32 and sent from the metadata processor 32 to the activity-detection module 34. The information determined by the metadata processor 32 may also be sent from the metadata processor 32 to the processor 36.

At step s10, the activity-detection module 34 processes the TV program 2 or the programmatic metadata relating to the TV program 2 that are provided to the activity-detection module 34 by the content provider 28. This processing by the activity-detection module 34 may be performed to detect, determine, or assess a level of activity within some or all of the TV program 2. For example, the activity-detection module 34 may assess the activity level throughout the TV program 2, e.g., the scene 8 may be determined to have a relatively high activity level, whereas a portion of the TV program 2 that is different from the scene 8 may have a relatively low activity level. The activity detector 34 may determine time locations (within the TV program 2) of those regions in the TV program 2 having high activity levels. Also, the activity detector 34 may determine time locations (within the TV program 2) of those regions in the TV program 2 having low activity levels. In other words, the activity-detection module 34 detects activity within the audio and visual content of the TV program 2 to, in effect, create an "activity map" for the TV program 2.

The detection, determination, or assessment of a level of activity may comprise using an output (that corresponds to the same TV program 2) of the metadata processor 32. For example, the detection, determination, or assessment of a level of activity within some or all of the TV program 2 may depend on the genre of the TV program 2 (for example, an action movie may be expected to have a higher activity level than a drama movie). Any appropriate process or algorithm may be used by the activity-detection module 34 to determine, detect, or asses an activity level.

The activity-detection module 34 may perform any appropriate media-analysis process at step s10. Such processes may be performed to determine values for appropriate parameters or metrics related to the TV program 2 or to the programmatic metadata. Examples of such parameters or metrics include, but are not limited to, number of bits, number of frames, texture metrics, activity-level metrics, a number of bytes per video frame, I-frames, P-frames, B-frames, shot boundaries, advertisement locations, presence of high motion activity, audio or textual mood measurements, etc.

In some embodiments, the activity-detection module 34 may process a number of parameters that relate to the multimedia stream (i.e., the TV program 2) and output a measure of activity. For example, the parameter values may be mapped to an activity-level scale that ranges, e.g., from 1 to 100. This activity-level value may depend on the number of bits per frame and the number of shot cuts in a defined number of previous frames. Using a defined mapping, this activity level may then be mapped to an "activity level category," e.g., "Slow/Low," "Medium," and "Fast/High."

A process performed by the activity-detection module 34 may be manual (e.g., performed by a human operator) or automatic.

At step s12, the information determined by the activity-detection module 34 at step s10 (e.g., the determined, detected, or assessed activity level or category or the activity map for the TV program 2) is output by the activity-detection module 34 and sent from the activity-detection module 34 to the processor 36.

At step s14, the template selector 40 selects and retrieves a template from the set of program templates stored in the database 38. This selection of a template by the template selector 40 may be performed using the information determined by the metadata processor 32 at step s6 (e.g., the genre of the TV program 2, etc.) which is sent from the metadata processor 32 to the processor 36 (i.e., the template selector 40 of the processor 36) at step s8. For example, the template selector 40 may select a program template corresponding to the determined genre of the TV program, e.g., if the TV program 2 is determined to be a sports program, then the template selector 40 may select a program template for a sports program.

At step s16, the program template retrieved by the template selector 40 from the database 38 is output by the template selector 40 and sent from the template selector 40 to the metadata-placement module 42.

At step s18, the metadata-placement module 42 processes some or all information received by it. In other words, the metadata-placement module 42 may process some or all of the following data: the TV program 2, the programmatic metadata relating to the TV program 2, the output of the metadata processor 32, the output of the activity detector 34, and the output of the template selector 40.

In this embodiment, the metadata-placement module 42 processes some or all of its received inputs to determine when in the TV program 2 programmatic metadata are to be provided for consumption by the user 16. The metadata-placement module 42 may determine that the TV program 2 comprises a number of portions with different activity levels. The metadata-placement module 42 may assign different amounts of programmatic metadata to these portions. The amount of programmatic metadata assigned to a portion may be dependent upon (e.g., proportional to) the activity level determined for that portion.

For example, the metadata-placement module 42 may determine that the TV program 2 comprises a number of portions with a relatively high activity level and a number of sections with a relatively low activity level. The metadata-placement module 42 may assign relatively more programmatic metadata to the regions of low activity and relatively less programmatic metadata to the regions of high activity. In other words, the metadata-placement module 42 may determine that relatively large amounts of the programmatic metadata are to be provided for consumption by the user 16 during parts of the TV program 2 that have relatively low levels of activity. For example, the metadata-placement module 42 may assign relatively large amounts of the programmatic metadata to commercial breaks in the TV program 2. Also, the metadata-placement module 42 may determine that relatively small amounts of the programmatic metadata are to be provided for consumption by the user 16 during playback of the parts of the TV program 2 that have relatively high levels of activity.

Furthermore, the metadata-placement module 42 may determine that programmatic metadata relating to a specific event (e.g., the scene 8) within the TV program 2 are to be provided for consumption to the user 16 during (or close to) playback of that event (e.g., during, or shortly after, playback of the scene 8 to the user 16). In other words, the metadata-placement module 42 may determine to which part or parts of the multimedia content certain parts of the programmatic metadata relate.

Also, in this embodiment, the metadata-placement module 42 processes some or all of its received inputs to determine, when programmatic metadata are to be provided for consumption by the user 16, how much (i.e., what volume of) programmatic metadata are to be provided for consumption by the user 16.

Also, in this embodiment, the metadata-placement module 42 processes some or all of its received inputs to determine, when programmatic metadata are to be provided for consumption by the user 16, how quickly (i.e., at what speed) programmatic metadata are to be provided for consumption by the user 16. For example, the metadata-placement module 42 may determine programmatic metadata should be provided, at relatively high speed, for consumption by the user 16 during parts of the TV program 2 that have relatively low levels of activity. Also, the metadata-placement module 42 may determine programmatic metadata are to be provided, at relatively low speed, for consumption by the user 16 during playback of the parts of the TV program 2 that have relatively high levels of activity.

Thus, the metadata-placement module 42, in effect, distributes the programmatic metadata relating to the TV program 2 throughout the TV program 2 depending on the level of activity during the TV program 2. For example, a greater volume of programmatic metadata may be assigned to (or placed with) parts of the TV program 2 that have a relatively low activity level, whereas a lesser volume of programmatic metadata may be assigned to (or placed with) parts of the TV program 2 that have a relatively high activity level. The distribution of programmatic metadata may also be such that programmatic metadata relating to a specific part of the multimedia content are assigned to that part.

An advantage provided by such distribution of the programmatic metadata throughout the TV program 2 is that relatively large amounts programmatic data may be assigned to parts of the TV program 2 that have relatively low activity levels. Thus, when programmatic metadata are provided for consumption by the user 16 (as described in more detail below), relatively large amounts of programmatic metadata tend to be available to the user 16 during lulls, or relatively slow-paced, parts of the TV program 2 (e.g., during commercial breaks). Furthermore, during parts of the TV program 2 that have relatively low activity levels, programmatic metadata may be provided to the user 16 at relatively high speed (i.e., relatively fast-paced). The parts of the TV program 2 that have relatively low activity levels tend to be parts of the TV program 2 that do not hold the user's attention, i.e., parts in which the user 16 may be distracted. Thus, the parts of the TV program 2 that have relatively low activity levels tend to be parts of the TV program 2 during which that the user 16 is more likely to consume other media (e.g., programmatic metadata related to the TV program 2). Thus, the above described method and system advantageously provide more programmatic metadata, or provide programmatic metadata faster, during periods in which the user 16 is more likely to consume that information.

A further advantage provided by such distribution of the programmatic metadata throughout the TV program 2 is that relatively small amounts programmatic data may be assigned to parts of the TV program 2 that have relatively high activity levels. Thus, when programmatic metadata are provided for consumption by the user 16 (as described in more detail below), relatively small amounts of programmatic metadata tend to be available to the user 16 during relatively fast-paced parts of the TV program 2 (e.g., during action scenes in a movie, etc.). Furthermore, during parts of the TV program 2 that have relatively high activity levels, programmatic metadata may be provided to the user 16 at relatively low speed (i.e., relatively slow-paced). The parts of the TV program 2 that have relatively high activity levels tend to be parts of the TV program 2 that hold the user's attention (i.e., "grip" the user 16). In such parts of the TV program 2, the user 16 tends to be less likely to be distracted than during slower-paced parts of the TV program 2. Thus, the parts of the TV program 2 that have relatively high activity levels tend to be parts of the TV program 2 during which that the user 16 is less likely to consume other media (e.g., programmatic metadata related to the TV program 2). Thus, the above described method and system advantageously provide less of the programmatic metadata, or provide programmatic metadata more slowly, during periods in which the user 16 is less likely to consume that information.

In other embodiments, the metadata-placement module 42 may distribute programmatic metadata over the TV program 2 in a different way. For example, relatively small amounts of programmatic metadata may be assigned to parts of the TV program 2 that have relatively low activity levels, and relatively large amounts of programmatic metadata may be assigned to parts of the TV program 2 that have relatively high activity levels.

Thus, at step s18, the metadata-placement module 42 may determine how the programmatic metadata related to the TV program 2 are to be distributed over the TV program 2.

At step s20, the metadata distribution determined by the metadata-placement module 42 is output by the metadata-placement module 42 and sent from the metadata-placement module 42 to the metadata binder 44.

At step s22, the metadata binder 44 binds the programmatic metadata related to the TV program 2. In this embodiment, the metadata binder 44 may bind the programmatic metadata as an additional data stream (i.e., an "information stream") or by augmenting the data stream (i.e., the transport stream) that is used to transport the multimedia content. For example, in some embodiments the metadata binder 44 may bind the programmatic metadata "indirectly" through a parallel-feed representation. Such a parallel-feed representation may be customized for the receiving device (i.e., the tablet computer 18). The programmatic metadata may be bound, or encoded, into an information stream that is useable by the receiving client device (i.e., the tablet computer 18). Also, in some embodiments, the metadata binder 44 may bind the programmatic metadata into the media container of the TV program 2 and the programmatic metadata may be supplied to one or more client devices with the TV program 2. The programmatic metadata may, for example, be bound into a transport stream. However, in other embodiments, the programmatic metadata may be delivered to the tablet computer 18 in a different format, e.g., the programmatic metadata may be "loosely" bound via a set of web-services that may deliver the programmatic metadata to the tablet computer 18 as "chunks" of programmatic metadata.

The programmatic metadata may be bound to or encoded using any appropriate system or method. This may be performed in such a way that the programmatic metadata and the TV program 2 are time synchronized. For example, XML structures may be used to time represent the metadata.

The programmatic metadata may be bound such that the bound programmatic metadata have one or more timestamps. Such a timestamp may be for aligning display of the programmatic metadata with display of the TV program 2, i.e., a timestamp may indicate (e.g., to the tablet computer 18) when, relative to the display of the TV program 2, the programmatic metadata are to be presented (e.g., displayed) to the user 16.

Also, the programmatic metadata may be bound such that the bound programmatic metadata have information indicating how the programmatic metadata are to be displayed. For example, the bound programmatic metadata may comprise a "lifespan" value that may indicate (e.g., to the tablet computer 18) for how long a particular portion of the programmatic metadata is to be displayed. Also for example, the bound programmatic metadata may comprise a specification for a display window in which a particular portion of the programmatic metadata is to be displayed (e.g., by the tablet computer 18). Also for example, the bound programmatic metadata may comprise a specification for a format (e.g., video, text, images, etc.) in which a particular portion of the programmatic metadata is to be displayed (e.g., by the tablet computer 18).

At step s24, the bound programmatic metadata are output by the metadata binder 44 and sent from the metadata binder 44 to the tablet computer 18, e.g., via the Internet 24.

At step s26, the set-top box 22 sends the TV program 2 to the TV 20. The set-top box 22 may also process (e.g., decode) the TV program 2 such that the TV program is in a format that may be displayed on the TV 20.

At step s28, the TV program 2 is displayed on the TV 20 to the user 16.

At step s30, the tablet computer 18 presents (e.g., displays or plays-back) the programmatic metadata relating to the TV program 2 that are received by the tablet computer 18 from the metadata binder 44. The tablet computer 18 may process (e.g., decode) the programmatic metadata prior to the programmatic metadata being displayed on the tablet computer 18.

The presentation of the programmatic metadata on the tablet computer 18 may be synchronized with the display of the TV program 2 on the TV 20. This may be facilitated by the timestamp of the bound programmatic metadata. Also, this synchronization may comprise communication between the tablet computer 18 and the set-top box 22 or the TV 20. Thus, the TV program 2 and the programmatic metadata related to that TV program 2 are provided to the devices of the user 16 (i.e., the TV 20 and the tablet computer 18) as parallel feeds.

The synchronization of the presentation of the programmatic metadata with the display of the TV program 2 may provide that programmatic metadata are provided for consumption by the user 16 during the periods within the TV program 2 to which that programmatic metadata was assigned (by the metadata-placement module 42 at step s18). Thus, the display of the TV program 2 on the TV 20 to the user 16 (step s28) and the presentation of programmatic metadata on the tablet computer 18 to the user 16 (step s30) tend to be such that programmatic metadata are presented to the user 16 in greater volume or at a higher speed during periods in the TV program 2 with relatively low activity and also such that programmatic metadata are presented to the user 16 in lesser volume or at a lower speed during periods in the TV program 2 with relatively high activity.

Thus, a process of presenting programmatic metadata for consumption by the user 16 is provided.

The above described system and method advantageously tend to provide that an appropriate time or location (relative to primary media, e.g., the TV program 2) at which to present supplementary data (e.g., programmatic metadata) to a user is determined. The supplementary data are provided to the user 16 at the determined time (relative to the primary media). Thus, presentation of supplementary data may be tailored to the primary media to which the supplementary data relates (or to properties of a particular client device upon which the supplementary data are to be presented). This tends to be able to be done in such a way as to not to distract the user 16 from the primary media-consumption experience.

The above described system and method advantageously tend to use a combination media analysis (e.g., activity-level detection) or media-content templates (e.g., program templates for different genres of TV program) to determine a placement (i.e., a location of presentation) for supplementary data (e.g., programmatic metadata related to the primary media) relative to the primary media. The supplementary data may then be provided, e.g., for discovery by the user according to the determined placement.

The above described system and method advantageously tend to augment a user's media-consumption experience.

The above described system and method advantageously tend to provide that a user is more likely to consume relevant supplementary information. The supplementary information may, for example, include one or more advertisements, and so the user tends to be more likely to be exposed to those advertisements.

The above described method and apparatus tend to provide a solution to the problem that, conventionally, the secondary multimedia content may be presented to the user in such a way that the user is distracted from the primary multimedia content, e.g., during periods within the primary multimedia content in which key events occur or in which lots of "activity" (i.e., action) occurs. Thus, the above described method and apparatus tend to provide that the user is less likely to miss key events, etc., within the primary multimedia content.

Also, the above described method and apparatus tend to provide a solution to the problem that, conventionally, lots of secondary multimedia content may be presented to the consumer during periods within the primary multimedia content in which key events occur or in which lots of "activity" (i.e., action) occurs. Thus, the above described method and apparatus tend to provide that the user is more likely to be exposed to the secondary multimedia content.

In the above embodiments, the method of presenting programmatic metadata is implemented in the example network described above with reference to FIG. 2. However, in other embodiments, the method of presenting programmatic metadata is implemented in a different network. For example, the method may be implemented in a network that comprises one or more further modules such as a device-selection module (which may be a module that is configured to select, from a set of available devices, one or more devices upon which the supplementary data are to be presented), a device binder (which may be a module that is configured to customize, or filter, the supplementary information depending on one or more capabilities of the device that is to present the supplementary data).

In the above embodiments, processed programmatic information related to the TV program is delivered to the client device (i.e., the tablet computer) by the service provider. However, in other embodiments, the processed programmatic metadata may be retrieved by a client device (e.g., via the Internet) from a location remote from the tablet computer (e.g., the processed programmatic information may be stored by the service provider).

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of providing additional information to a first client device for presentation using the first client device, the additional information being related to multimedia content, the multimedia content being provided to a second client device for presentation using the second client device, the method comprising:

acquiring, by one or more processors, of a service module, the multimedia content from a content provider;

acquiring, by the one or more processors, of the service module, the additional information;

determining, by the one or more processors of the service module, using the acquired multimedia content, an activity level, for at least a portion of the multimedia content, the activity level being indicative of a level of action that occurs within the at least a portion of the multimedia content;

assigning, by the one or more processors, of the service module, using the determined activity level and the acquired additional information, some or all of the additional information to the at least a portion of the multimedia content for which the activity level has been determined, the amount of the additional information assigned to the at least a portion of the multimedia content being dependent upon the activity level;

wherein if the activity level indicates that a greater amount of action occurs within the portion of the multimedia content than within other portions of the multimedia content, then a lesser amount of additional information is assigned to the portion of the multimedia content; and wherein if the activity level indicates that a lesser amount of action occurs within the portion of the multimedia content than within other portions of the multimedia content, then a greater amount of additional information is assigned to the portion of the multimedia content; and providing, by the one or more processors, of the service module, the assigned additional information to the first client device.

* * * * *